Oct. 23, 1934.  F. H. SEBRING, JR., ET AL  1,977,700
JIGGER FOR FORMING ARTICLES OF PLASTIC MATERIAL
Filed July 14, 1933
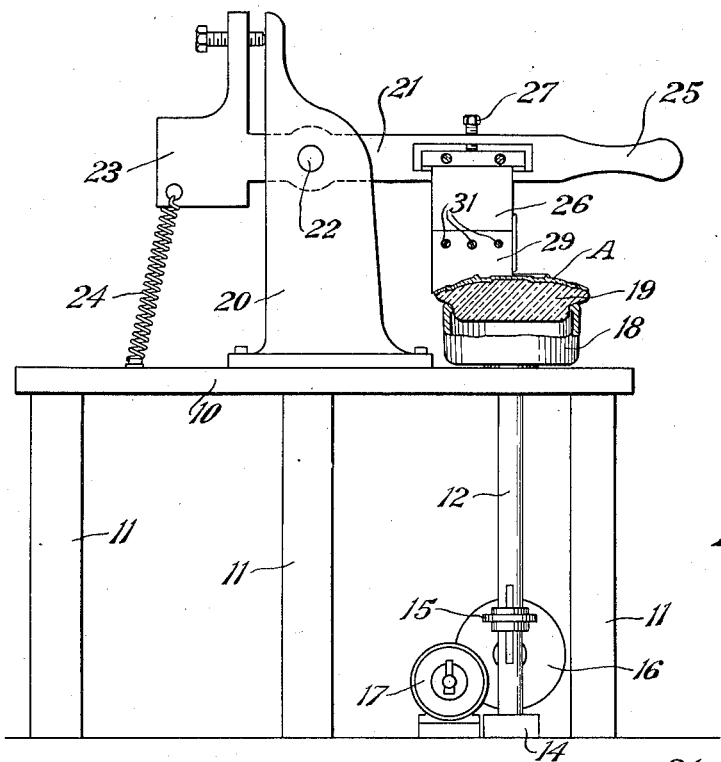
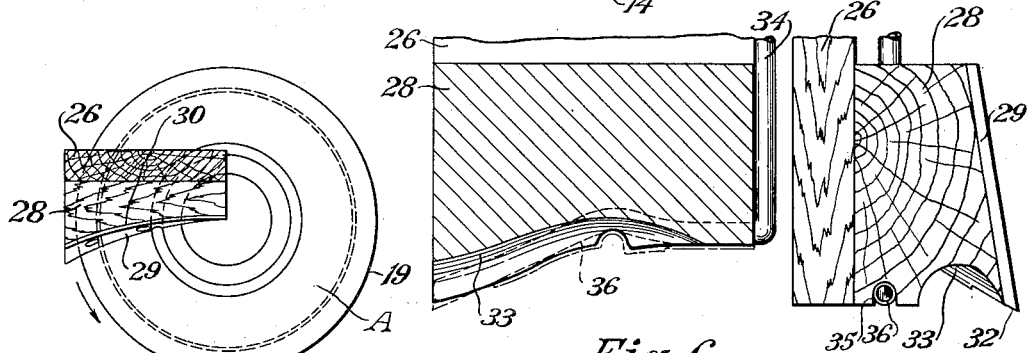
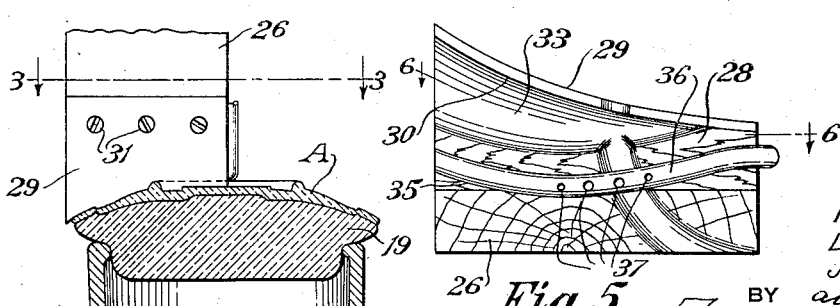
INVENTORS
F. H. Sebring Jr.
L. C. Loschky
J. T. Pugh
BY Frease and Bishop
ATTORNEYS Patented Oct. 23, 1934

1,977,700

UNITED STATES PATENT OFFICE

1,977,700

JIGGER FOR FORMING ARTICLES OF PLASTIC MATERIAL

Frank H. Sebring, Jr., Ludwig C. Loschky, and John T. Pugh, Salem, Ohio; said Loschky and said Pugh assignors to said Sebring, Jr.

Application July 14, 1933, Serial No. 680,387

8 Claims. (Cl. 25—25)

The invention relates to jiggers for forming plates, dishes and other ware of plastic clay for the manufacture of semiporcelain, chinaware and the like.

Jiggering is the process of shaping, most commonly used in forming tableware and the like, upon a machine known as a jigger, which consists of a spindle having means for rotating the same and provided with a head into which a plaster mold in fitted and which runs perfectly true.

A counterbalanced arm or lever is provided adjacent to the head and arranged to swing up and down upon a pivot, this arm being arranged to be pulled down until it is in substantially horizontal position, at which point it is stopped by a suitable stop device such as a set screw.

A tool is carried upon this arm, shaped to the outer contour of the piece of ware to be formed, while the mold is shaped to the inner contour of the ware. This tool comprises a straight steel plate disposed radially to the mold and adapted to come to rest at a point spaced from the mold a distance equal to the thickness of the ware desired. In hollow ware such as cups, bowls and the like, the mold forms the exterior and the tool the interior of the ware.

In the operation of the jigger, a flat sheet of clay, known as a bat, is firmly placed upon the revolving mold and the arm carrying the tool is lowered, bringing the tool into contact with the upper surface of the bat, whereby the desired shape of ware is quickly produced. The thickness of the ware may be readily adjusted by means of the set screw above mentioned, which determines the operative position of the arm. When the piece of ware is formed, the mold is removed from the head of the jigger and placed in a drying room and then finished by glazing, burning, etc.

The top surface of the plastic clay bat is scraped by the forming edge of the jigger tool, the plastic clay thus removed from the bat accumulating upon the jigger tool and requiring frequent removal of this excess clay. This piling up of the clay upon the jigger tool is a very serious disadvantage as it considerably slows up the operation due to the frequent interruptions to permit the operator to remove the clay from the jigger tool which must be done very frequently in order to prevent spoiling of the ware being jiggered.

It is necessary during the operation for the operator to apply water to the top surface of the plastic clay bat so as to produce a smooth finished surface formed by the jigger tool. This water is applied by hand from time to time.

An object of the present improvement is to provide a jigger tool so shaped that clay scraped from the top surface of the plastic clay bat will not pile up upon the tool.

Another object is to provide means for automatically applying water to the top surface of the bat during the operation of the jigger.

A further object of the improvement is to provide a jigger tool having a blade curved toward the direction of rotation of the rotating mold in order to prevent clay from piling up upon the jigger tool.

A further object of the improvement is to provide a jigger tool having a groove in its under surface extending through the outer edge of the tool in order to automatically feed the clay outward through the groove to the outer side of the jigger tool as the clay is scraped from the top surface of the bat.

Another object is to provide such a groove in the under surface of the jigger tool starting at a point near the inner edge of the tool and flared toward the outer edge thereof.

A further object is to provide such a groove in the under surface of the jigger tool which is curved toward the direction of rotation of the rotating mold.

The above, together with other objects which will be later pointed out, or which will be obvious from the drawing and following description, may be attained by constructing the improved jigger in the manner hereinafter described and illustrated in the accompanying drawing, in which Figure 1 is an elevation of a jigger provided with the improved jigger tool, parts being broken in section for the purpose of illustration;

Fig. 2, an enlarged elevation of the improved jigger tool showing the rotating mold in section;

Fig. 3, a detail plan section taken on the line 3—3, Fig. 2;

Fig. 4, an enlarged end view of the improved jigger tool showing the outer end thereof;

Fig. 5, an enlarged bottom plan view of the jigger tool; and

Fig. 6, a section on the line 6—6, Fig. 5.

Similar numerals refer to similar parts throughout the drawing.

The improved jigger tool to which the invention pertains is shown in Fig. 1 mounted upon a jigger which is illustrated conventionally and comprises a bench or table 10 which may be mounted upon uprights or supports 11 and provided with a vertical spindle 12 journaled through a suitable bearing in the table 10 and a bearing 14 located at or near the floor.

For the purpose of rotating the spindle, a disk 15 may be fixed thereon and arranged to be adjusted longitudinally for changing the speed of the spindle. This disk cooperates with a friction drive 16 driven as by any suitable source of power such as the motor 17.

The head 18 at the upper end of the spindle 12 may be of any usual and well known construction and is adapted to receive a mold, indicated at 19, shaped to produce the desired interior shape of the dish or other article to be formed.

A bracket or support 20 may be mounted upon the table, adjacent to the head 18, and an arm 21 is pivoted thereon as at 22, having a counterweight 23 at its rear end, and if desired, a spring 24 may be connected to the rear end of the arm 21 and to the table 10 to assist in returning the arm to the raised or inoperative position when the operator releases the handle 25.

The jigger tool is carried upon a depending bar or strip 26 connected to the arm 21 adjacent to the handle portion thereof and adapted to be adjusted vertically as by the set screw 27. The tool comprises generally a block 28, of wood or the like, connected to the lower end portion of the bar 26 and provided on the side away from the bar with the blade 29.

The block 28 is tapered from its outer end toward its inner end and the surface thereof away from the bar 26 is preferably slightly curved, as shown at 30, and tapered from the bottom toward the top.

The blade 29 is curved to fit the curved surface 30 of the block 28 and is attached thereto as by the screws 31. It will be seen that the blade 29 is thus curved outward from the center of the mold in the direction in which the mold is rotated instead of being radially disposed, with reference to the mold, as in common practice.

The lower edge of the blade 29 is beveled as shown at 32 and the lower edge of the block 28 is provided with a groove 33 adjacent to the beveled edge of the tool, said groove extending from a point near the inner end of the block through the outer end thereof and being flared from the inner toward the outer end, as shown in Figs. 4, 5 and 6.

As the mold carrying the bat A of plastic clay is rotated in the direction of the arrow in Fig. 3 and the jigger tool is moved down to the operative position as shown in Figs. 1 and 2, the top surface of the clay will be scraped and smoothed by the beveled edge 32 of the jigger tool and formed to the desired shape as shown in said figures. The clay scraped therefrom, instead of piling up upon the under surface of the jigger tool behind the blade, will pass through the curved flared groove 33 and out through the outer end of the same.

For the purpose of applying water to the bat during the operation, a pipe 34 may be connected to the block 28, the lower end thereof being located through a groove 35 in the underside of the block, as indicated at 36, and provided with a plurality of perforations 37 to spray water upon the top surface of the bat. This pipe 34 may be connected by a flexible hose to any suitable source of water supply and a valve (not shown) may be located in the line to control the flow of water to the pipe 34. If desired, this valve may be arranged to be operated in unison with the lowering of the arm 21 so that as the jigger tool is brought into position upon the bat, the water is sprayed from the pipe onto the bat.

We claim:

1. A jigger tool including a block, a blade upon one side surface of the block and there being an outwardly flared groove in the underside of the block contiguous to the blade and leading from a point spaced from the inner edge of the block through the outer edge of the block.

2. A jigger tool including a block, a blade upon one side surface of the block and there being a groove in the underside of the block adjacent to the blade and leading from a point near the inner edge of the block through the outer edge of the block, said groove being flared toward the outer edge of the block.

3. A jigger tool including a block and an outwardly curved blade upon one side surface of the block.

4. A jigger tool including a block, an outwardly curved blade upon one side surface of the block, and there being a groove in the underside of the block adjacent to the blade and leading from a point near the inner edge of the block through the outer edge of the block.

5. A jigger tool including a block, an outwardly curved blade upon one side surface of the block, and there being a curved groove in the underside of the block adjacent to the blade and leading from a point near the inner edge of the block through the outer edge of the block.

6. A jigger tool including a block, an outwardly curved blade upon one side surface of the block, and there being a flared groove in the underside of the block adjacent to the blade and leading from a point near the inner edge of the block through the outer edge of the block.

7. A jigger tool including a block, an outwardly curved blade upon one side surface of the block, and there being a curved, flared groove in the underside of the block adjacent to the blade and leading from a point near the inner edge of the block through the outer edge of the block.

8. A jigger tool including a block, a blade upon one side surface of the block, and a perforated water pipe in the underside of the block.

FRANK H. SEBRING, JR.
LUDWIG C. LOSCHKY.
JOHN T. PUGH.